L. A. WAYMIRE.
CARVING FORK.
APPLICATION FILED SEPT. 5, 1916.
1,220,479.
Patented Mar. 27, 1917.
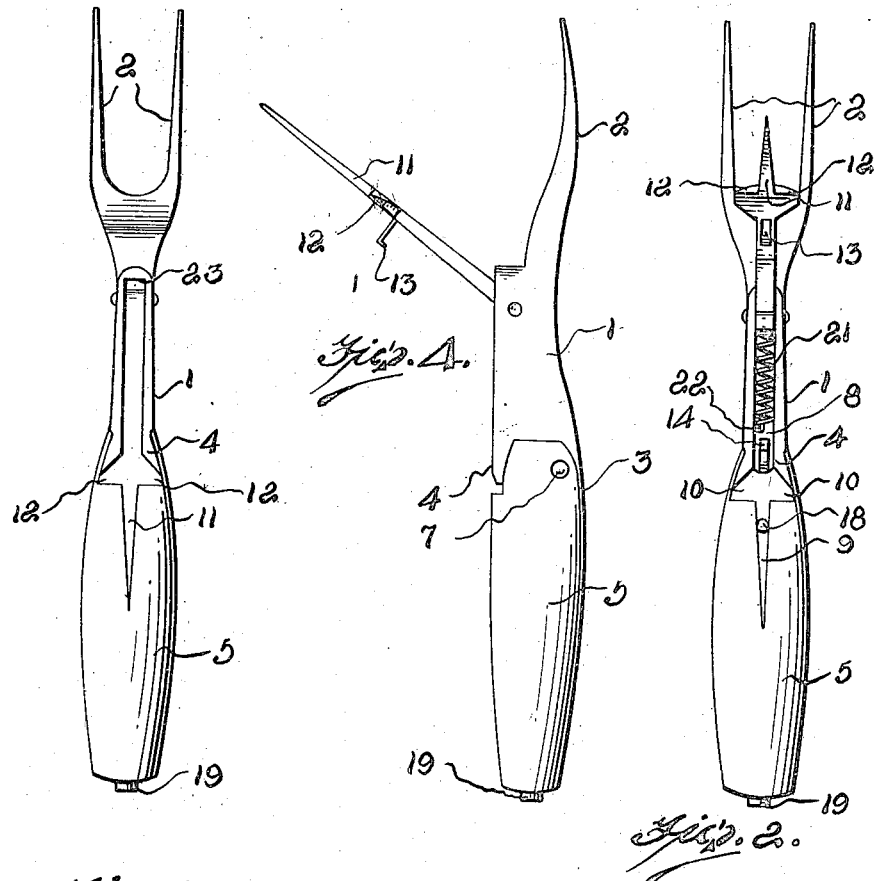
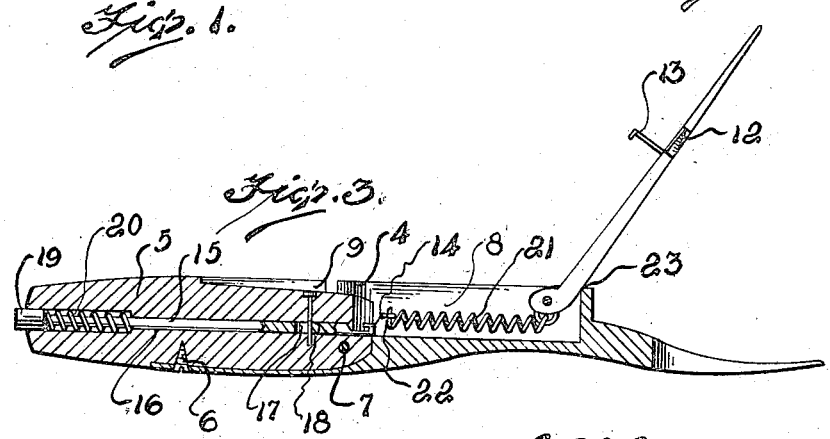
Witnesses
R. K. Stevens.
D. C. Morris.
Inventor
L. A. Waymire.
By 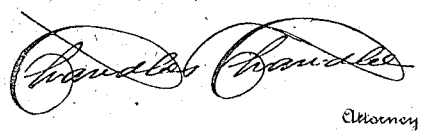
Attorney

UNITED STATES PATENT OFFICE.

LETTIE A. WAYMIRE, OF OROVILLE, CALIFORNIA.

CARVING-FORK.

1,220,479.   Specification of Letters Patent.   Patented Mar. 27, 1917.

Application filed September 5, 1916.   Serial No. 118,559.

*To all whom it may concern:*

Be it known that I, LETTIE A. WAYMIRE, a citizen of the United States, residing at Oroville, in the county of Butte, State of California, have invented certain new and useful Improvements in Carving-Forks; and I do hereby declare the following to be a full, clear, and exact description of the invention, such as will enable others skilled in the art to which it appertains to make and use the same.

This invention relates to a carving fork.

An object of the invention resides in the provision of an improved fork by means of which meat may be effectively held during a carving operation.

A further object of the invention resides in so constructing the device that a supplemental tine will be provided which will be normally located in the handle but which may be automatically projected into operative position.

With these and other objects in view, such as will appear as the description progresses, my invention comprises the combination and arrangement of parts as set forth in and falling within the scope of the appended claims.

Referring to the drawing:

Figure 1 is a plan view of a fork constructed in accordance with my invention with the supplemental tine in its inoperative position.

Fig. 2 is a similar view with the tine in its operative position.

Fig. 3 is a longitudinal sectional view.

Fig. 4 is a side elevation with the supplemental tine open.

Referring to the drawing wherein like parts are indicated by like characters throughout the several views:

My device consists of a tang 1 on which are formed integral tines 2. This tang is provided with a pair of spaced fingers 3 and 4 which embrace a handle 5 made of wood or other suitable material. Extending through the end of the finger 3 and engaged in the handle 5 is a screw 6, while extending at right angles to this screw and through the finger 3 adjacent its point of juncture with the tang is a rivet 7. This tang is thus held on the handle.

The tang 1 is provided with a recess 8 which extends longitudinally thereof and is open at one side. This recess 8 communicates with a recess 9 in the handle 5, the recess 9 having a pair of oppositely arranged enlargements 10.

Pivotally mounted in this recess 8 in the tang is a supplemental tine 11 which has a pair of projections 12 extending from the sides thereof, which projections form a guard. When the tine 11 is in its inoperative position it lies in the recesses 8 and 9 and the projections 12 in the enlargements 10.

In order that the tine 11 may be maintained within the recesses 8 and 9, normally, I have provided a catch 13 on the said tine which is adapted to engage a complemental catch 14. This catch 14 is formed on a rod 15 which is slidably mounted in a longitudinally extending hole 16 in the handle 5. This rod 15 is provided with a slot 17 through which a pin 18 extends for maintaining the catch 14 in its proper position and for limiting the movement of the rod. On the end of the rod a push button 19 is formed which projects beyond the end of the handle 5. This button 19 is normally pushed outwardly by a coil spring 20 which encircles the rod 15 and is located in the hole 16. When the catches 13 and 14 are in engagement with each other the spring 20 will maintain them in such relation.

In order that the tine 11 may be projected outwardly, automatically, when the button 19 is pushed and the catches 13 and 14 are disengaged, I have provided a coil spring 21 which is located in the recess 8 in the tang 1. This spring is secured at one of its ends to the tang 1, at 22, and at its other end to the tine 11 adjacent its pivotal point but so that when the tine is located in the recesses 8 and 9 a portion of it will pass about the pivot so that the tendency will be to rotate the tine 11 on its pivot and project it outwardly. The outward movement of the tine 11 is limited by its contact with a shoulder 23 on the tang 1.

When the tine 11 is in the position shown in Fig. 4 and the device is being used the tines 2 and 11 may be made to penetrate the meat and inasmuch as they engage at three points the meat will be firmly held and prevented from slipping.

It will be seen that I have provided a fork which includes a pair of stationary tines and a movable tine which are so located that the meat being cut will be readily held in place. Further, I have provided a catch by means of which the movable tine will be kept, normally, in alinement with the tang and handle and in recesses therein. I have further provided a spring for automatically moving the tine to an operative position when the catch is released.

What I claim is:—

1. The combination in a carving fork, of a tang provided with integral tines, a supplemental tine pivoted to the tang for movement into and out of operative position, releasable means normally holding the supplemental tine in inoperative position, and means for automatically moving the supplemental tine to operative position when the first mentioned means is released.

2. In a carving fork, the combination with a tang having integral tines, of a supplemental tine pivoted to the tang and adapted in its inoperative position to lie folded thereagainst, means releasably holding the supplemental tine in inoperative position, and means serving to move the supplemental tine outwardly on its pivot when said first named means is released.

3. In a carving fork, the combination with a tang having a recess therein, of a tine pivoted in the recess and foldable to lie therewithin, means for releasably maintaining the tine within the recess, means serving to swing the tine outwardly from the recess when the first named means is released, and means for limiting outward movement of the tine.

4. In a carving fork, the combination with a tang and handle having alined recesses therein, of a tine pivotally mounted on the tang and adapted to lie within said recesses, said tine having a catch thereon, a spring pressed catch mounted in the recess in the tang and arranged to engage the catch on the tine, and a spring secured within the recess in the tang and to the tine and urging the latter outwardly.

In testimony whereof, I affix my signature, in the presence of two witnesses.

LETTIE A. WAYMIRE.

Witnesses:
W. R. RIDDLE,
E. B. RUGH.

Copies of this patent may be obtained for five cents each, by addressing the "Commissioner of Patents, Washington, D. C."